(12) United States Patent
Huber et al.

(10) Patent No.: US 11,788,571 B2
(45) Date of Patent: Oct. 17, 2023

(54) MULTI-HEAD BOLT AND FASTENER SYSTEM

(71) Applicant: PERI SE, Weissenhorn (DE)

(72) Inventors: Julian Huber, Merklingen (DE); Andrew Read, Voehringen (DE); Florian Sturm, Unterroth (DE)

(73) Assignee: PERI SE, Weissenhorn (DE)

( * ) Notice: Subject to any disclaimer, the term of this patent is extended or adjusted under 35 U.S.C. 154(b) by 0 days.

(21) Appl. No.: 16/988,538

(22) Filed: Aug. 7, 2020

(65) Prior Publication Data
US 2022/0042539 A1  Feb. 10, 2022

(51) Int. Cl.
F16B 35/06 (2006.01)
F16B 5/02 (2006.01)

(52) U.S. Cl.
CPC .............. F16B 35/06 (2013.01); F16B 5/02 (2013.01)

(58) Field of Classification Search
CPC ..... B25B 13/48; B25B 31/005; F16B 5/0208; F16B 35/06; F16B 5/02
See application file for complete search history.

(56) References Cited

U.S. PATENT DOCUMENTS

| | | |
|---|---|---|
| 316,619 A | 4/1885 | Hayes |
| D31,749 S | 10/1899 | North |
| D51,204 S | 8/1917 | Hemenway |
| 1,340,470 A | 5/1920 | Whitmore |
| 1,355,503 A * | 10/1920 | Riise ................ F16B 39/24 411/149 |
| 2,388,658 A * | 11/1945 | Pumphrey ......... F16B 35/06 411/401 |
| 2,695,688 A | 11/1954 | Wollpert |
| 3,134,290 A | 5/1964 | Jentoft |
| D203,412 S | 1/1966 | Wing |
| 3,664,434 A | 5/1972 | Connor |
| D224,881 S | 10/1972 | Raynor |
| D225,209 S | 11/1972 | Raynor |
| 3,828,382 A | 8/1974 | Nakamura |
| 3,855,895 A | 12/1974 | Francis |
| D243,154 S | 1/1977 | Dieme |
| D243,580 S | 3/1977 | Decaro |
| 4,030,694 A | 6/1977 | Schimmel |
| D248,014 S | 5/1978 | Decaro |
| 4,211,385 A | 7/1980 | Johanson |

(Continued)

FOREIGN PATENT DOCUMENTS

| | | |
|---|---|---|
| AU | 7436674 | 4/1976 |
| AU | 2019100345 | 5/2019 |

(Continued)

OTHER PUBLICATIONS

Lopez M, FR-2645224-A Machine translation (Year: 1990).*

(Continued)

*Primary Examiner* — Lee A Holly
(74) *Attorney, Agent, or Firm* — SLEMAN & LUND LLP

(57) ABSTRACT

A multi-head bolt having a bolt shaft defining a longitudinal axis of the multi-head bolt and a multi-head disposed at a first end of the bolt shaft, the multi-head having at least three pawls, each pawl having a fixed radial orientation relative to the bolt shaft and having a primary plane being aligned with the longitudinal axis of the bolt shaft and having a support surface.

30 Claims, 9 Drawing Sheets

(56) References Cited

U.S. PATENT DOCUMENTS

| | | |
|---|---|---|
| 4,235,560 A | 11/1980 | Schimmel |
| D265,174 S | 6/1982 | Boyle |
| 4,473,209 A | 9/1984 | Gallis |
| 4,527,760 A | 7/1985 | Salacuse |
| 4,547,835 A | 10/1985 | Pansaerts |
| 4,640,478 A | 2/1987 | Leigh-Monstevens |
| D313,344 S | 1/1991 | Tritle |
| D317,862 S | 7/1991 | Yamamoto |
| 5,076,748 A | 12/1991 | Waterfield |
| 5,083,740 A | 1/1992 | Sawyer |
| 5,169,270 A * | 12/1992 | Erickson ............... B25B 13/48 411/419 |
| 5,251,868 A | 10/1993 | Trimmer |
| 5,284,408 A | 2/1994 | Duran |
| 5,802,795 A | 9/1998 | Myers |
| D423,341 S | 4/2000 | Swanstrom |
| D473,126 S | 4/2003 | Fergusson |
| D496,260 S | 9/2004 | Echazabal |
| 10,167,890 B2 | 1/2019 | Steffenfauseweh |
| 2002/0006319 A1 | 1/2002 | Ross |
| 2002/0148195 A1 | 10/2002 | Ward |
| 2003/0096072 A1 | 5/2003 | Johnson |
| 2004/0069926 A1 | 4/2004 | Ward |
| 2004/0089787 A1 | 5/2004 | Myers |
| 2004/0104333 A1 | 6/2004 | Ward |
| 2006/0010831 A1 | 1/2006 | Skakie |
| 2008/0307736 A1 | 12/2008 | Trimmer |
| 2009/0242730 A1 | 10/2009 | Ward |
| 2009/0242733 A1 | 10/2009 | Ward |
| 2011/0192956 A1 | 8/2011 | Ward |
| 2012/0286134 A1 | 11/2012 | Rojas Pimienta |
| 2017/0335580 A1 | 11/2017 | Laures |
| 2019/0032689 A1* | 1/2019 | Beardmore ........... F16B 5/0208 |
| 2021/0095471 A1 | 4/2021 | Jie |
| 2022/0042539 A1 | 2/2022 | Huber |

FOREIGN PATENT DOCUMENTS

| | | | |
|---|---|---|---|
| CA | 2987176 | 4/2019 | |
| CH | 416028 A | 6/1966 | |
| CN | 201037314 | 3/2008 | |
| CN | 201671337 | 12/2010 | |
| CN | 201786024 | 4/2011 | |
| CN | 201786025 | 4/2011 | |
| CN | 201786026 | 4/2011 | |
| CN | 202090596 | 12/2011 | |
| CN | 202248855 | 5/2012 | |
| CN | 202925885 | 5/2013 | |
| CN | 203783141 | 8/2014 | |
| CN | 302899978 | 8/2014 | |
| CN | 203846775 | 9/2014 | |
| CN | 104775615 | 7/2015 | |
| CN | 105952143 | 9/2016 | |
| CN | 205894689 | 1/2017 | |
| CN | 206337818 | 7/2017 | |
| CN | 107654062 | 2/2018 | |
| CN | 107700828 | 2/2018 | |
| CN | 109518962 | 3/2019 | |
| CN | 109518964 | 3/2019 | |
| CN | 109518965 | 3/2019 | |
| CN | 109736568 | 5/2019 | |
| CN | 306644500 | 6/2021 | |
| DE | 1434431 | 6/1969 | |
| DE | 2137505 | 2/1973 | |
| DE | 2403325 | 7/1975 | |
| DE | 7245172 | 5/1976 | |
| DE | 2460867 | 6/1976 | |
| DE | 2531463 | 2/1977 | |
| DE | 7804666 | 6/1978 | |
| DE | 2747064 | 5/1979 | |
| DE | 2844615 | 11/1979 | |
| DE | 3036306 | 4/1982 | |
| DE | 3147081 A1 | 12/1982 | |
| DE | 8500485 | 4/1985 | |
| DE | 4440739 | 6/1995 | |
| DE | 10392457 | 3/2005 | |
| DE | 202016101415 | 3/2016 | |
| DE | 212017000250 U1 | 7/2019 | |
| EP | 1375781 B1 | 1/2004 | |
| EP | 1975338 | 10/2008 | |
| EP | 3330458 | 6/2018 | |
| ES | 2221585 | 12/2004 | |
| FR | 706474 A | 6/1931 | |
| FR | 792003 A | 12/1935 | |
| FR | 909215 A | 5/1946 | |
| FR | 1250778 | 1/1961 | |
| FR | 2429885 | 1/1980 | |
| FR | 2576946 | 8/1986 | |
| FR | 2645224 | 10/1990 | |
| FR | 2645224 A * | 10/1990 | ............ F16B 35/06 |
| FR | 3028877 | 5/2016 | |
| FR | 3046804 | 7/2017 | |
| GB | 670689 A | 4/1952 | |
| GB | 725131 A | 3/1955 | |
| GB | 930579 A | 7/1963 | |
| GB | 1069702 | 5/1967 | |
| GB | 1290562 | 9/1972 | |
| GB | 2239686 | 7/1991 | |
| JP | H03250155 A | 11/1991 | |
| JP | H03293475 A | 12/1991 | |
| JP | H04289377 A | 10/1992 | |
| JP | H05230997 A | 9/1993 | |
| JP | H0782886 A | 3/1995 | |
| JP | H10252265 A | 9/1998 | |
| JP | 2002227409 | 8/2002 | |
| JP | 2013079514 | 5/2013 | |
| JP | 2018096506 | 6/2018 | |
| KR | 20000031725 | 6/2000 | |
| KR | 200200938 | 10/2000 | |
| KR | 20020005146 | 1/2002 | |
| KR | 100568666 | 4/2006 | |
| KR | 200418039 | 6/2006 | |
| KR | 100749906 | 8/2007 | |
| KR | 100803257 | 2/2008 | |
| KR | 20090034065 | 4/2009 | |
| KR | 100903397 | 6/2009 | |
| KR | 20090091390 | 8/2009 | |
| KR | 20090092929 | 9/2009 | |
| KR | 20100023228 | 3/2010 | |
| KR | 20100127464 | 12/2010 | |
| KR | 101008146 | 1/2011 | |
| KR | 20130056384 | 5/2013 | |
| KR | 101311070 | 9/2013 | |
| KR | 101612088 | 4/2016 | |
| KR | 101630765 | 6/2016 | |
| KR | 20170132519 | 12/2017 | |
| KR | 20180000946 | 1/2018 | |
| KR | 101921028 | 11/2018 | |
| KR | 20190019654 | 2/2019 | |
| KR | 20190029155 | 3/2019 | |
| KR | 20190089355 | 7/2019 | |
| KR | 3010407480000 | 1/2020 | |
| TW | 371977 U | 10/1999 | |
| TW | M288317 U | 3/2006 | |
| WO | 9917908 | 4/1999 | |
| WO | 2007117962 | 10/2007 | |
| WO | 2009001421 | 12/2008 | |
| WO | 2013061227 | 5/2013 | |
| WO | WO-2013061227 A2 * | 5/2013 | ............ D06F 37/20 |
| WO | WO-2018069803 A1 * | 4/2018 | .......... B25B 31/005 |
| WO | 2018098024 A1 | 5/2018 | |
| WO | 3218751001 | 7/2022 | |
| WO | 3218751002 | 7/2022 | |
| WO | 3218751003 | 7/2022 | |
| WO | 3218751004 | 7/2022 | |

OTHER PUBLICATIONS

Peri GmbH, Self-Spanning-Dancefloor, a new formwork concept/structure to form bridge pier caps, Dec. 3, 2020, 18 pages.

* cited by examiner

MULTI-HEAD BOLT AND FASTENER SYSTEM

FIELD OF THE INVENTION

The present invention relates to a multi-head bolt used as a quick-access-blind-fastener and further to a fastener system including the bolt. In particular, the present invention relates to a fastener system used to connect and align two objects to each other, wherein the fastening action requires access from only one side of the objects. The present invention also provides a method for such aligning and connecting.

BACKGROUND OF THE INVENTION

Certain fasteners of the prior art generally require access from both sides of the members and the use of two tools—and which is not convenient in certain configurations. In addition, there are known fasteners which, whilst allowing an assembly from one side of the junction only, also draw the members together, being easily removable and re-usable, which can be provided as one assembly and which can be used from either side of the junction. A special configuration of such fastener is also known as a hammer-head bolt, as it shown for example in documents GB 2,239,686 A, FR 2,429,885 A1, CN 109518965 A, DE 21 2017 000 250 U1 or U.S. Pat. No. 5,076,748 A. However, the known bolt configuration is inconvenient in view of absorbing shear forces, tensile forces or traction forces that can arise between the panels. In case of the occurrence of lateral shear forces in-between the panels there is always inherently a force component that acts laterally onto the longitudinal axis of the fastener bolt itself what leads to a misalignment of the fastener.

SUMMARY OF THE INVENTION

The present application provides provide a bolt and a fastener system being improved over the prior art insofar as being able to better divert shearing forces and/or tensile and/or traction forces. At least, the invention shall provide an improved method for an alignment and connection of such objects.

One aspect of the disclose provides a multi-head bolt, comprising a bolt shaft defining a longitudinal axis of the multi-head bolt; a multi-head disposed at a first end of the bolt shaft, the multi-head comprising at least three pawls, each pawl having a fixed radial orientation relative to the bolt shaft and having a primary plane being aligned with the longitudinal axis of the bolt shaft and having a support surface.

In one example, the primary plane for each pawl is parallel to two opposing lateral sides of each respective pawl.

In one example, each pawl has an angled side that intersects the primary plane and wherein a radial distance of the angled side relative to bolt shaft linearly decreases as measured from the support surface to the first end of the bolt.

In one example, the pawls extend from the bolt shaft in a star-shape configuration symmetrically relative to an outer circumference of the bolt shaft.

In one example, at least one pawl is in the form of a fin.

In one example, the support surface extends perpendicularly to the longitudinal axis of the bolt shaft, projecting therewith radially from the bolt shaft's outer circumference.

In one example, at least one pawl is fin-shaped such that the primary plane lies on the longitudinal axis of the bolt shaft and the support surface is perpendicular to the primary plane.

In one example, a width of at least one pawl is smaller than a diameter of the bolt shaft.

In one example, the width of the at least one pawl is at least 15% of a diameter of the bolt shaft and at maximum 65% of the diameter of the bolt shaft.

In one example, the width of the at least one pawl is at least 25% of a diameter of the bolt shaft and at maximum 40% of the diameter of the bolt shaft.

In one example, the width of the at least one pawl is about 33% of the diameter of the bolt shaft.

In one example, a width defined between the two lateral sides of the at least one pawl is substantially constant along the longitudinal axis.

In one example, the bolt shaft defines a cone shape at the first end of the bolt shaft.

In one example, at least a portion of the angled side is coplanar plane to the cone shape of the first end of the bolt shaft.

In one example, the bolt shaft defines has a cone end at an opposite end relative to the multi-head to facilitate insertion of a nut.

In one example, the multi-head bolt further comprises a tension-rod-shank fixed to an end of the bolt shaft opposing the multi-head, on which shank a nut can be screwed.

In one example, the at least three pawls comprises four pawls.

In one example, the bolt shaft defines a hole extending through the bolt shaft at an opposite end relative to the multi-head a for securing a safety split pin.

Another aspect of the disclosure provides a fastener system for connecting and aligning elements together, the system comprising: a multi-head bolt for fastening and aligning the elements, the bolt comprising a bolt shaft defining a longitudinal axis of the multi-head bolt, a multi-head disposed at a first end of the bolt shaft and comprising a plurality of pawls each arranged in a fixed radial orientation relative to the bolt shaft and each having a primary plane being aligned with the longitudinal axis of the bolt shaft and having a support surface; and the plurality of elements each defining an opening extending therethrough, the opening having a shape corresponding to a cross-section profile of the multi-head of the bolt through which opening the multi-head pawls pass.

In one example, the fastener system further comprises a fastening element configured to connect the elements in a fixed manner.

In one example, the multi-head bolt has an external thread and the fastener element comprises a nut having a female thread fitting onto the external thread of the bolt.

In one example, the opening defines cut-outs in a plane direction of the element corresponding to a number and dimension of the plurality of pawls.

In one example, at least one pawl is fin-shaped and has a width that is smaller than a diameter of the bolt shaft.

In one example, the width of the at least one pawl is at least 15% of a diameter of the bolt shaft and at maximum 65% of the diameter of the bolt shaft.

In one example, the width of the at least one pawl is at least 25% of a diameter of the bolt shaft and at maximum 40% of the diameter of the bolt shaft.

In one example, the width of the at least one pawl is about 33% of the diameter of the bolt shaft.

In one example, a width defined between two lateral sides of the at least one pawl is substantially constant along the longitudinal axis.

In one example, the bolt shaft defines a cone shape at the first end of the bolt shaft.

In one example, each pawl has an angled side that intersects the primary plane and wherein a radial distance of the angled side relative to bolt shaft linearly decreases as measured from the support surface to the first end of the bolt.

In one example, at least a portion of the angled side is coplanar to a cone-shaped portion of the first end of the bolt shaft.

In one example, the bolt shaft defines has a cone end at an opposite end relative to the multi-head to facilitate insertion of a nut.

In one example, the elements comprise anti-twist-structures in an element surface being adjacent to the openings, in or at which anti-twist-structure a pawl can rest, respectively, after having rotated the bolt around the longitudinal axis and having inserted the bolt through the opening.

In one example, the anti-twist structure is a recess in which the pawl can rest, such that when resting in the recess rotational movement of the pawl is prevented when the recess receives the support surface of the pawl.

In one example, the element comprises at least one twist-stop protruding from a surface of at least one of the elements and preventing rotation of the multi-head bolt around the longitudinal axis after having inserted the bolt through the opening.

In one example, the twist-stop comprises an abutting surface against which a lateral side of the pawl abuts when being inserted and having turned the bolt until abutting the abutting surface.

In one example, the fastener system comprises a separate plate in which an anti-twist-structure is incorporated and/or at least one twist-stop protruding from the plate is provided, in which plate is to be arranged between the head of the multi-head bolt and an element surface.

In one example, a number of anti-twist structures and/or a number of twist-stop(s) is less or at least equal to the number of pawls.

In one example, the pawls are branched off from the bolt shaft in a star-shaped configuration that is essentially symmetrical around an outer circumference of the bolt shaft.

In one example, the support surface extends essentially perpendicularly to the longitudinal axis of the bolt shaft projecting therewith radially from an outer circumference of the bolt shaft.

In one example, the opening is located in a frame of the element.

In one example, the elements comprises at least one of a formwork panel or a formwork element.

Another aspect of the disclosure provides a method of aligning and connecting at least two elements together, comprising: inserting a multi-head bolt through respective openings of a plurality of panels such that a plurality of pawls with a fixed radial orientation relative to the multi-head bolt align with a plurality of cut-outs of the plurality of panels; rotating the multi-head bolt relative to the plurality panels such that the pawls are out of alignment with the plurality of cutouts such that the plurality of panels are secured relative to the multi-head bolt.

In one example, rotating the multi-head bolt comprises rotating the multi-head bolt and retracting the bolt in an opposite direction of an insertion direction until a support surface of the pawls abuts against a surface of one of the elements.

In one example, the method further comprises fastening the bolt relative to the elements with a fastening element.

BRIEF DESCRIPTION OF THE DRAWINGS

The invention description below refers to the accompanying drawings, of which.

DETAILED DESCRIPTION

Figure 1A:
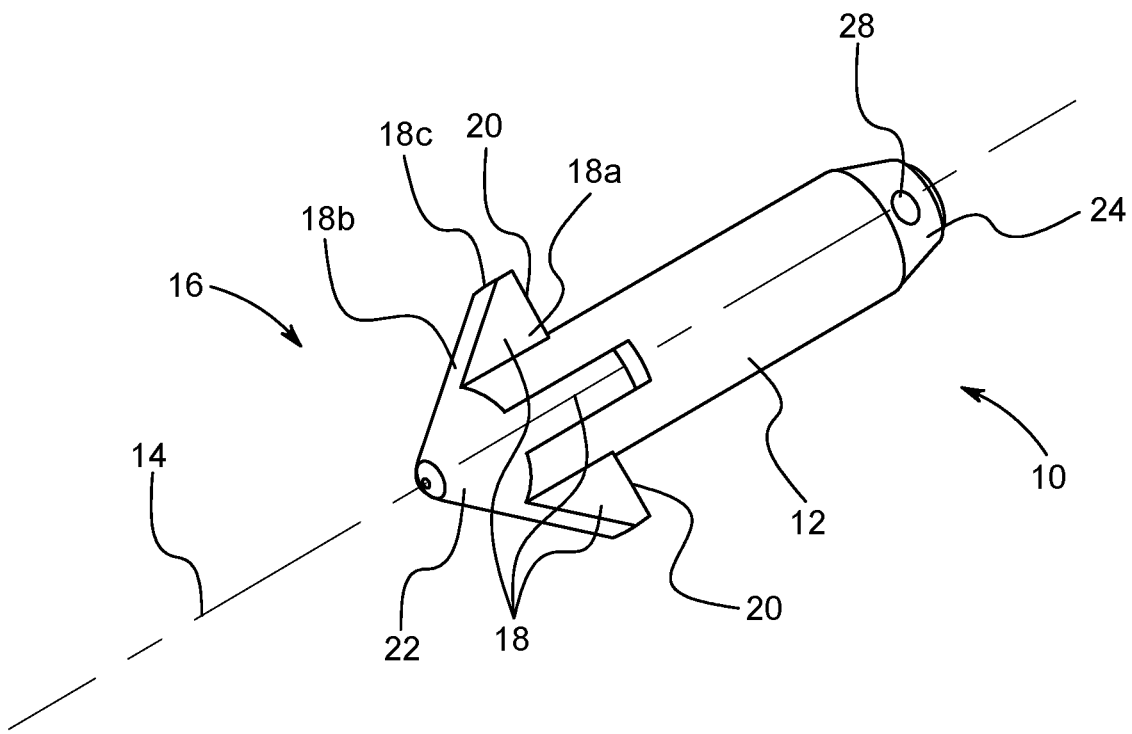
FIG. 1A is a perspective view of a multi-head bolt according to one or more aspects of the disclosure.
Figure 1B:
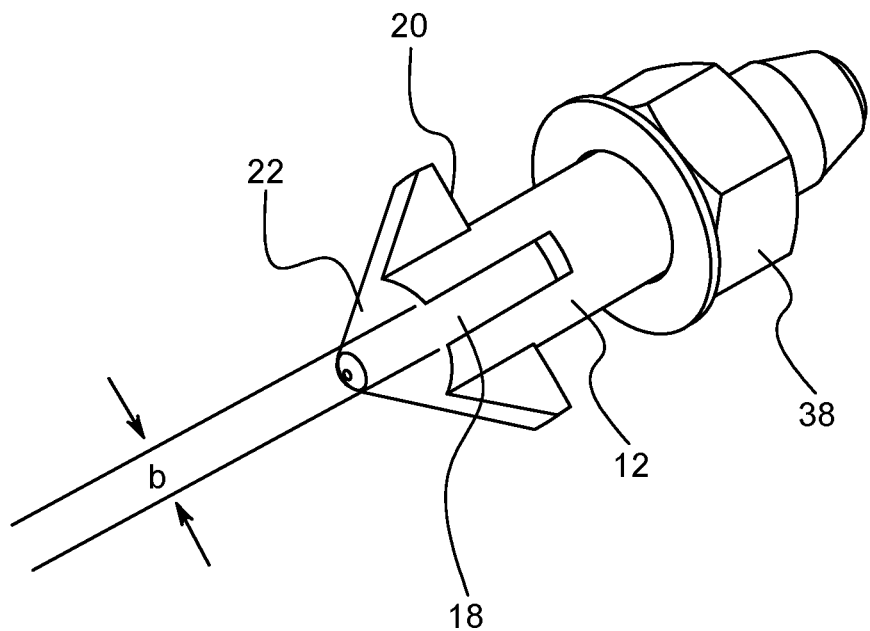
FIG. 1B is a perspective view of the multi-head bolt of FIG. 1B engaged with a nut according to one or more aspects of the disclosure.
Figure 1C:
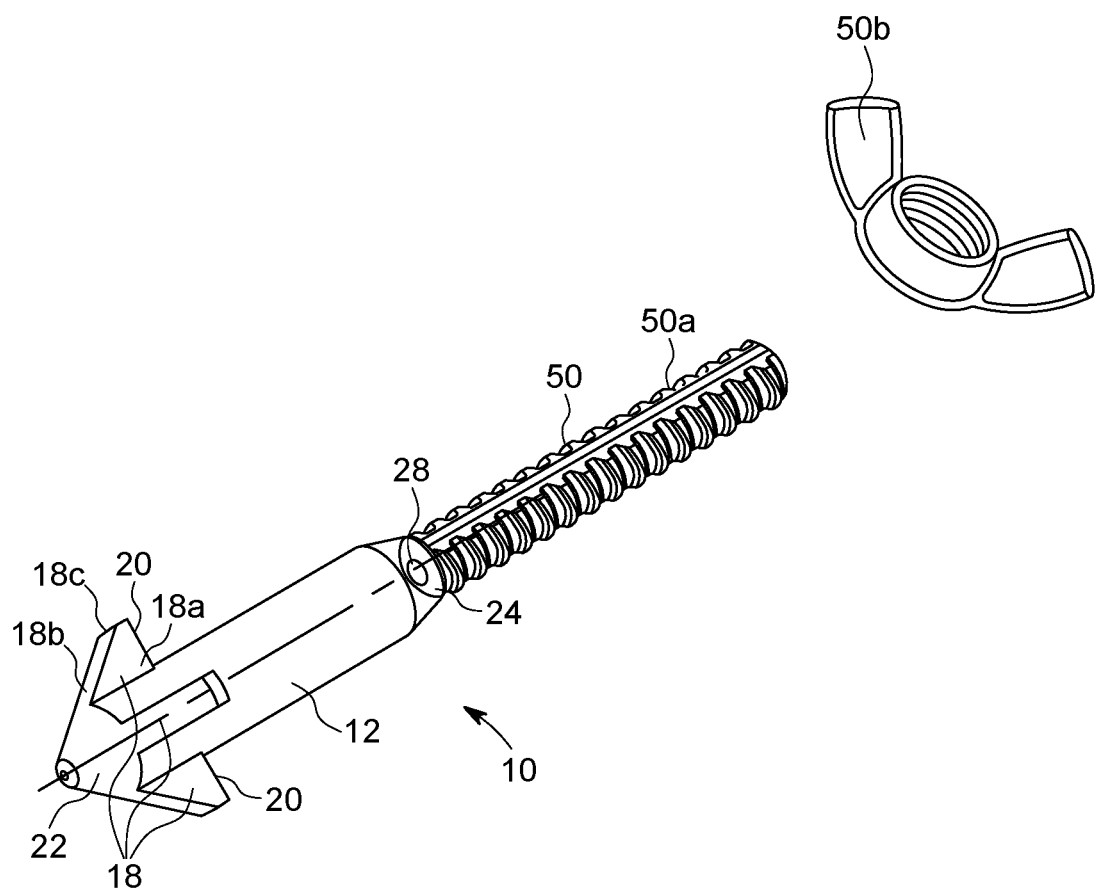
FIG. 1C is a perspective view of the multi-head bolt of FIG. 1A engaged with an extension shank according to one or more aspects of the disclosure.

FIG. 1A is a perspective view of a multi-head bolt 10 according to one or more aspects of the disclosure and FIG. 1B is a perspective view of the multi-head bolt 10 of FIG. 1A engaged with a nut 38 according to one or more aspects of the disclosure.

As shown in FIG. 1A, the multi-head bolt 10 (also referred to as bolt 10) has a longitudinal shaft 12 having a multi-head 16 at one end thereof. At least a portion of the longitudinal shaft 12 can be cylindrical or substantially cylindrical and can define a diameter. The longitudinal shaft 12 can include external threading for engaging with a nut, as described in detail below. In one example, the longitudinal shaft 12 can define a longitudinal axis 14 that is co-axial or substantially co-axial relative to the longitudinal shaft and the longitudinal shaft can define an outer circumference.

The multi-head 16 has a plurality of pawls 18 that extend radially from the longitudinal axis 14 defined by the longitudinal shaft 12. In the example of FIG. 1A, the multi-head 16 of the bolt 10 includes four pawls 18 that are arranged radially and symmetrically with respect to longitudinal axis 14 and can be arranged in a symmetrical star-shaped configuration around an outer circumference of the shaft 12. In other examples, the bolt 10 can include greater or fewer pawls 18 and can be arranged radially, symmetrically and/or arbitrarily with respect to longitudinal axis 14. For example, the multi-head 16 can include at least or exactly three pawls 18 that can be arranged arbitrarily or radially and symmetrically with respect to longitudinal axis 14. In another example, the multi-head 16 can include at least or exactly five pawls 18 that can be arranged arbitrarily or radially and symmetrically with respect to longitudinal axis 14.

Each of the pawls 18 can be unitarily and rigidly formed with respect to the longitudinal shaft 12 of the bolt 10 such that each of the pawls 18 has a fixed radial orientation with respect to the longitudinal axis. In this regard, the pawls 18 can be inelastic and immovable relative to the longitudinal shaft 12 of the bolt 10. The pawls 18 can be generally fin-shaped and can be defined by a support surface 20, lateral sides 18*a*, and angled side 18*b*. The lateral sides 18*a* of each respective pawl 18 can be parallel to one another and can be parallel to a plane extending radially with respect to longitudinal axis 14. The lateral sides 18*a* can extend between the support surface 20, the angled side 18*b*, and the longitudinal shaft 12. The support surface 20 can be perpendicular to the lateral sides 18*a* and can extend along a plane that is perpendicular to the longitudinal axis 14.

The angled side 18*b* can extend from a cone-shaped portion 22 to the support surface 20. In some examples, the angled side 18*b* can extend as a continuous surface from the cone-shaped portion 22 to the support surface 20, while in other examples there can be a flat portion 18*c* between the angled side 18*b* and support surface 20. The angled side 18*b* can be coplanar with a cone-shaped portion 22 and can form a continuous, uninterrupted surface with the cone-shaped portion 22 and a plane coinciding with the angled side 18*b* can form an angle with the longitudinal axis 14. In one example, the angle can be an acute angle between 5 and 50 degrees and in another example, the angle can be about 45 degrees. While a cone-shaped portion 22 is depicted, it is contemplated that the portion 22 can be a truncated cone shape in other examples.

The lateral sides 18*a* can be parallel to each other and can both be parallel with a plane extending radially with respect to the longitudinal axis 14. In this regard, the lateral sides can be perpendicular to the support surface 20. By virtue of the configuration, a radial distance of angled side 18*b* relative to shaft 12 linearly decreases as measured from support surface 20 toward cone-shaped portion 22.

At an opposing end of the longitudinal shaft 12 relative to the cone-shaped portion 22 is a cone end 24 that defines a hole 28 therethrough. The hole 28 allows the bolt 10 to be secured by a safety split pin to one or more formwork panels or formwork elements. The cone end 24 facilitates the threading of nut 38 onto the longitudinal shaft.

As shown in FIG. 1B, the bolt 10 can be engaged with the nut 38 to facilitate engagement with formwork elements (for example one or more beams) and/or formwork panels and/or any pair of elements that can connected, as will be described in greater detail below. The nut 38 can have a female thread and can have wings to enable hand-tightening.

A width of the pawls 18, e.g., a distance between opposing lateral sides 18*a*, is depicted as a width b in FIG. 1B. The width can be measured at any portion of the pawl, and in one example the width can be measured at or near the support surface 20. In one example, the width of pawls 18 is less than a diameter of the shaft 12. In one particular example, the width can be at least 15% of the shaft diameter and at most 65% of the diameter of the shaft. In another example, the width can be in the range of 25% to 40% of the shaft diameter. In yet another example, the width b is approximately 33% of a diameter of the longitudinal shaft 12. In these examples, the diameter of the shaft 12 is measured at a middle portion of the shaft, e.g., a portion that is disposed between the panels 32 when secured thereto. In one example, a width of the pawl can be substantially constant along the longitudinal axis. A width of the pawl influences the load bearing capacity of the bolt in such a way that, the greater the width the greater the load-bearing capacity with respect to higher tensile force. The width also influences load-bearing capacity with respect to transverse force in an inverse manner, e.g. increasing width reduces load-bearing capacity with respect to transverse force. Above a certain width, almost no additional traverse force can be absorbed.

In one example, an extension shank 50 is disposed at the end of the shaft opposing the multi-head 16. By way of the extension shank 50, the shaft can be equipped with a tension rod. In another example, the end part of the shaft 12 the multi-head bolt 10 can be equipped with a tension rod. The shank 50 can have an external thread 50*a* on which a nut 50*b* can be screwed or the shank 50 can be in the form of an anchor that is to be fixed in the concrete. Such shank 50 is commercially available from DYWIDAG® known under the corresponding trademark DYWIDAG®-extension.

Each of the pawls 18 can define a primary plane associated therewith, the primary plane being defined as parallel to each of the lateral sides 18*a* and extending through the pawl 18 such that the longitudinal axis 14 lies on the primary plane. In the example of a four-pawl configuration, the primary plane of a pawl and its opposing pawl are co-planar. In this regard, the primary plane of the pawl 18 can be defined intersecting with the support surface 20 and angled edge 18*b* such that the longitudinal axis 14 lies upon the primary plane.

Figure 2A:
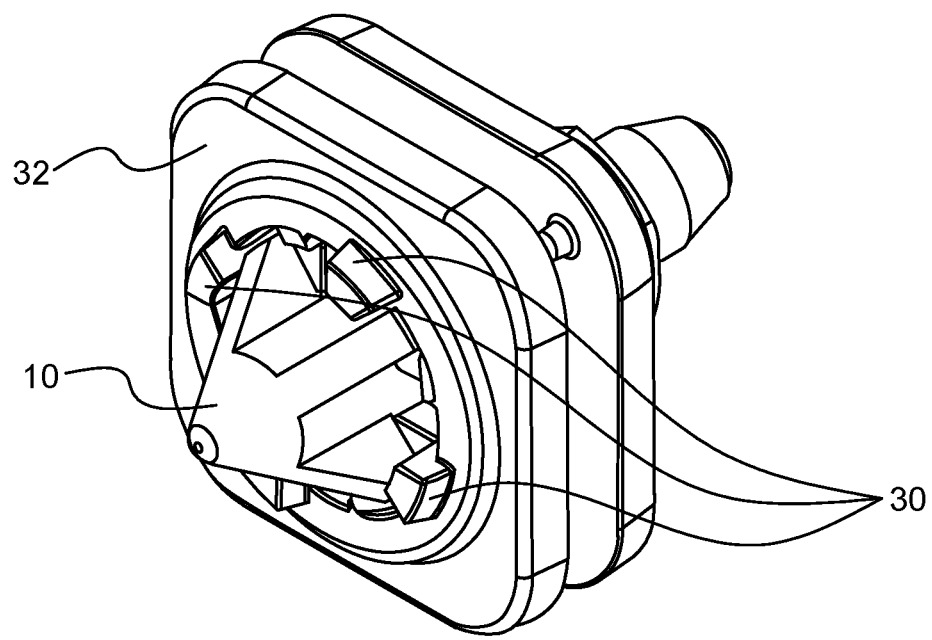
FIG. 2A is a perspective view of a multi-head bolt engaged with a plurality of panels according to one or more aspects of the disclosure.
Figure 2B:
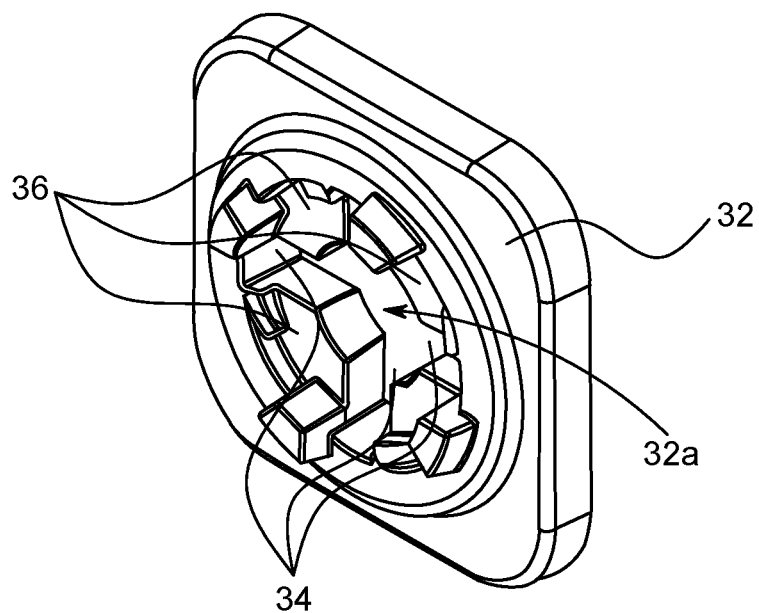
FIG. 2B is a perspective view of a multi-head bolt engaged with a panel having recesses according to one or more aspects of the disclosure

FIG. 2A is a perspective view of a multi-head bolt 10 engaged with a plurality of plates 32 according to one or more aspects of the disclosure and FIG. 2B is a perspective view of plate 32 having recesses according to one or more aspects of the disclosure.

Each of the plates 32 can engage with formwork panels or formwork elements, or in another example can be integrally formed with the formwork panel or formwork element, for example by welding or the like. Each of the plates 32 (e.g., a frame of the plate 32) define respective an opening 32*a* for receiving the bolt 10, with the opening 32*a* corresponding to an outer diameter of the longitudinal shaft 12. The opening 32*a* of the plates 32 can define cut-outs 34 shaped to receive the pawls 18 and to allow the pawls 18 to pass through the opening 32*a*. In this regard, the cut-outs 34 are positioned to correspond to radial positions of the pawls 18 and the number of cut-outs 34 corresponds to the number of pawls 18. For example, in the example of three pawls 18, the panel 32 defines three cut-outs 34.

The plates 32 can also define recesses 36 (e.g., anti-twist structures) that are circumferentially adjacent to the cut-outs 34. In this regard, the recesses 36 do not extend an entire thickness of the plates 32 and have a thickness that is less than the overall thickness of the plate 32. This thickness arrangement creates a space to receive the pawls 18, and in one example, the support surfaces 20, to ensure a locking arrangement, which will be explained in greater detail below. In one example, the recesses 36 can define chamfered edges to provide easier movement and insertion of the pawls 18 relative to the opening 32*a* and recesses 36. In one example, the recesses 36 can define a stepped design along a thickness direction of the plate 32 corresponding to a shape of the pawls 16. The plates 32 can also include stoppers 30 (e.g., twist-stop(s)) protruding from a surface of the plate 32 and extending above a surface of the plates 32 arranged circumferentially adjacent to the recesses 36 to prevent rotation of the bolt 10 and pawls 18 beyond a locking position and to prevent the respective pawls 18 from aligning with a cut-out 34 different from the cut-out through which it was advanced. In this regard, rotation of the pawls 18 and the multi-head can be prevent or limited when a lateral side 18*a* (e.g., an abutting surface or any other surface of the pawl) abuts against an abutting surface of the stopper 30. The number of stoppers 30 (e.g., twist-stop(s)) can be less than or at least equal to the number of pawls.

This provides a stable configuration for diverting a shear force and/or tension force from the bolt 10 to the plate 32. In the example of a star-like arrangement of the at least three pawls around the bolt shaft, any shear force is diverted in the plane of the panel irrespective from which direction it is caused. This provides a positive high clamp load and, in particular by virtue of the at least three pawls a high capability to absorb sheer loads and/or tensions loads aiding therewith to divert any shear force and/or tension force into those objects as fastened by the system, e.g., onto the panel's surface FIGS. 3A-D depict various stages of connecting a plurality of plates 32 with a multi-head bolt 10 according to one or more aspects of the disclosure.

Figure 3A:
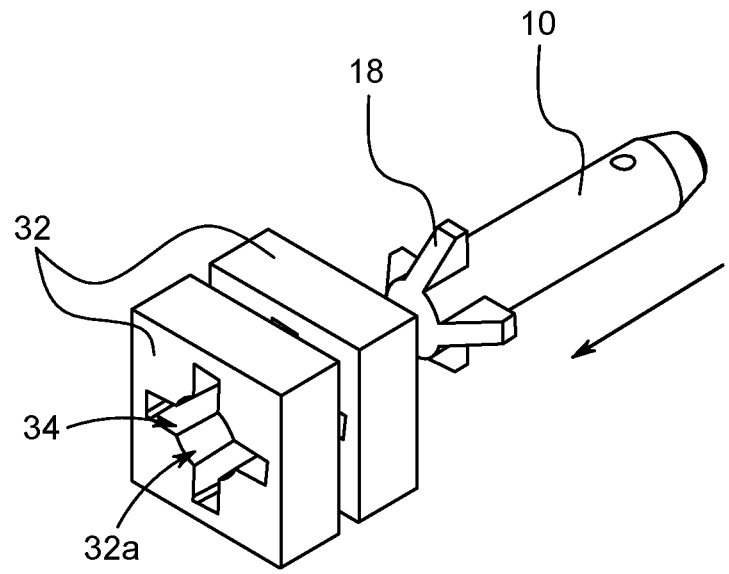
FIGS. 3A-D depicts various stages of connecting a plurality of panels with a multi-head bolt according to one or more aspects of the disclosure.

As shown in FIG. 3A, the bolt 10 is inserted into both of the respective openings 32a defined by the plates 32. In this regard, each of the pawls 18 of the multi-head 16 are aligned with the corresponding cut-outs 34 of the plates 32, allowing the pawls 18 and the bolt 10 to pass through the openings 32a.

By virtue of the relationship between cone-shaped portion 22 and angled edge 18b, the bolt 10 can be easily inserted through the openings 32a of the plates 32. Further, if the plates 32 are slightly out of alignment, the bolt 10 and the cone-shaped portion 22 and pawls 18 provide a centering function between the plates 32. For example, if the plates 32 are slightly out of alignment, pushing the bolt 10 with truncated cone 22 will automatically orient the plates 32 such that the openings 32a are aligned since the bolt 10 can only pass through the openings 32a and the pawls 18 can only pass through the cut-outs 34 when they are in alignment.

Figure 3B:
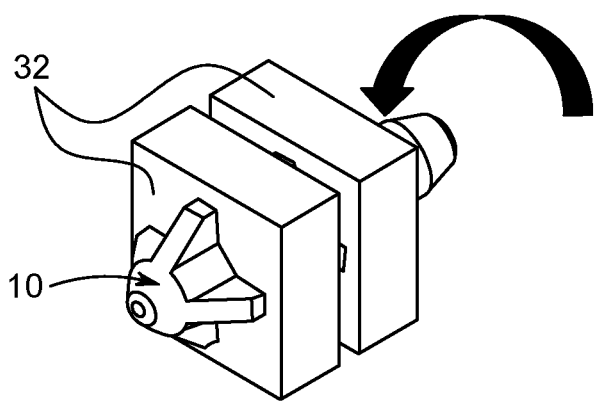

As shown in FIG. 3B, the bolt 10 has been inserted into both plates 32 and will be rotated according to the directional arrow. The pawls 18 having previously been aligned with cut-outs 34 will rotate out of position with cut-outs 34 and the support surfaces 20 of the pawls will engage with a face of the plate 32 (or within recesses 36, for example by retracting the bolt in a direction opposite of the insertion direction and allowing the pawls to rest and engage within the space defined by the recesses and preventing further rotation).

Figure 3C:
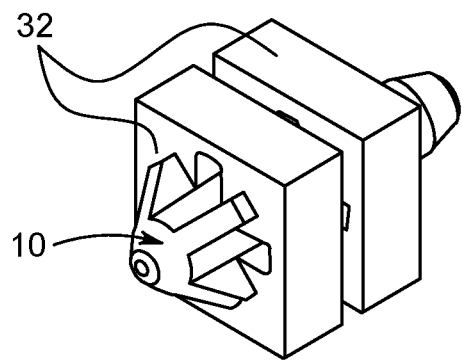

As shown in FIG. 3C, the bolt has been rotated (e.g., by 45 degrees or a geometric multiple) and the pawls 18 are 45 degrees out of alignment with the cut-outs 34, thereby preventing the bolt 10 from being removed from the plates 32 without additional rotation. In one example, the rotation of the pawls can be ceased or limited by one or more stoppers 30.

Figure 3D:
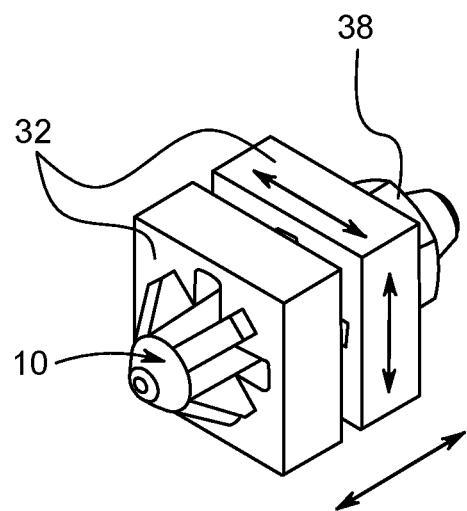

As shown in FIG. 3D, the plates 32 are aligned and engaged with one another by virtue of the bolt 10. A nut 38 (and optional washer) can be threaded onto the bolt 10 to secure the plates 32 relative to one another.

Figure 4A:
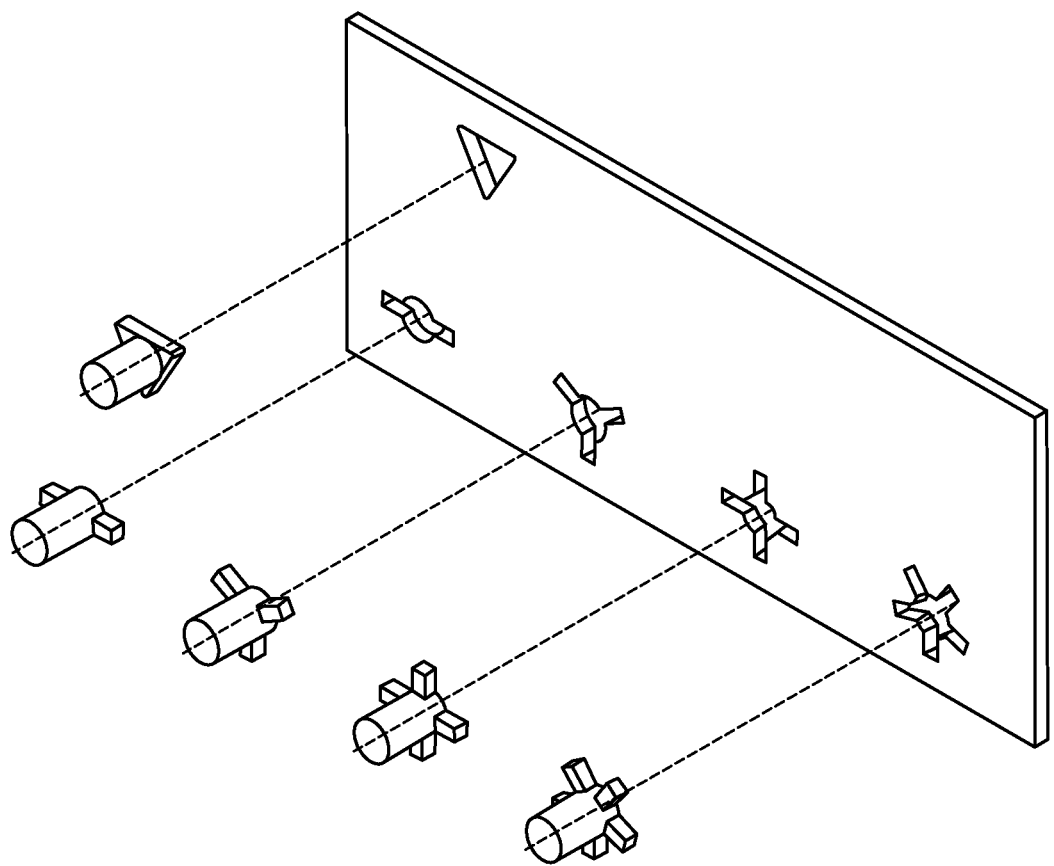
FIGS. 4A-E depicts examples of multi-head bolt geometries according to one or more aspects of the disclosure.

FIGS. 4A-E depict examples of multi-head bolt geometries according to one or more aspects of the disclosure. As shown, the multi-head of the bolt can be a triangle, a three-pawl, four-pawl, or five-pawl arrangement. Various multi-head configurations are their corresponding openings and cut-outs in an exemplary plate are depicted in FIG. 4A.

Figure 4B:
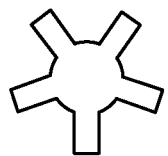

FIG. 4B depicts a five-pawl configuration in which five pawls are arranged symmetrically with respect to bolt shaft. In this regard, there is approximately 72 degrees between each of the pawls. With this multi-head, the plate can be configured with an opening that defines five cut-outs, five recesses, and five stoppers.

Figure 4C:
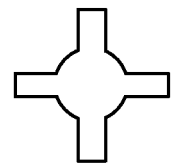

FIG. 4C depicts a four-pawl configuration in which four pawls are arranged symmetrically with respect to bolt shaft. In this regard, there is approximately 90 degrees between each of the pawls. With this multi-head, the plate can be configured with an opening that defines four cut-outs, four recesses, and four stoppers. In this example, each of the pawls can be diametrically opposed to a respective pawl. In this regard, each pawl can have an oppositely oriented pawl disposed 180 degrees therefrom.

Since the design of pawls as extending from the shaft simultaneously define and dictate the negative profile in an opening of the plate to push the bolt through, meaning the cut-outs for the pawls that extend from the cut-out for the circumference of the shaft, in one example the number of pawls is advantageously four. This allows for a configuration that each pawl namely decreases the support area on the surface of the plate on which the pawl can rest on after fastening the bolt—which is also dependent from the width of a pawl.

Figure 4D:
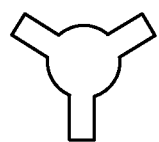

FIG. 4D depicts a three-pawl configuration in which three pawls are arranged symmetrically with respect to bolt shaft. In this regard, there is approximately 120 degrees between each of the pawls. With this multi-head, the plate can be configured with an opening that defines three cut-outs, three recesses, and three stoppers. Such a three-pawl configuration provides a well-balanced force distribution in the horizontal plane on the panel's surface in any direction around 360°.

Figure 4E:
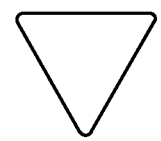

FIG. 4E depicts a multi-head having a triangular cross-section, with each corner defining a pawl and thus a three-pawl configuration. With this multi-head, the plate can be configured with an opening that defines three cut-outs, three recesses, and three stoppers.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

What is claimed is:

1. A multi-head bolt, comprising:
a bolt shaft defining a longitudinal axis of the multi-head bolt, at least a portion of the bolt shaft being cylindrical and defining a diameter;
a multi-head disposed at a first end of the bolt shaft, the multi-head comprising at least three pawls, each pawl having a fixed radial orientation relative to the bolt shaft and having a primary plane being aligned with the longitudinal axis of the bolt shaft and having a support surface and having an angled side that intersects the primary plane and being inelastic and immovable relative to the bolt shaft, wherein a radial distance of the angled side relative to the bolt shaft decreases as measured from the support surface to the first end of the bolt, wherein the at least three pawls are arranged around an outer circumference of the shaft.

2. The multi-head bolt of claim 1, wherein at least one pawl is fin-shaped such that the primary plane lies on the longitudinal axis of the bolt shaft and the support surface is perpendicular to the primary plane.

3. The multi-head bolt of claim 2, wherein a width of at least one pawl is smaller than a diameter of the bolt shaft.

4. The multi-head bolt of claim 3, wherein the width of the at least one pawl is at least 15% of a diameter of the bolt shaft and at maximum 65% of the diameter of the bolt shaft.

5. The multi-head bolt of claim 4, wherein the width of the at least one pawl is at least 25% of a diameter of the bolt shaft and at maximum 40% of the diameter of the bolt shaft.

6. The multi-head bolt of claim 4, wherein the width of the at least one pawl is 33% of the diameter of the bolt shaft.

7. The multi-head bolt of claim 1, wherein the radial distance of the angled side relative to bolt shaft linearly decreases as measured from the support surface to the first end of the bolt.

8. The multi-head bolt of claim 7, wherein the bolt shaft defines a cone shape at the first end of the bolt shaft.

9. The multi-head bolt of claim 8, wherein at least a portion of the angled side is coplanar plane to the cone shape of the first end of the bolt shaft.

10. The multi-head bolt of claim 1, wherein the primary plane for each pawl is parallel to two opposing lateral sides of each respective pawl.

11. The multi-head bolt of claim 10, wherein a width defined between the two lateral sides of the at least one pawl is constant along the longitudinal axis.

12. The multi-head bolt of claim 1, wherein the pawls extend from the bolt shaft in a star-shape configuration symmetrically relative to an outer circumference of the bolt shaft.

13. The multi-head bolt of claim 1, wherein at least one pawl is in the form of a fin.

14. The multi-head bolt of claim 1, wherein the support surface extends perpendicularly to the longitudinal axis of the bolt shaft, projecting therewith radially from the bolt shaft's outer circumference.

15. The multi-head bolt claim 1, wherein the bolt shaft defines has a cone end at an opposite end relative to the multi-head to facilitate insertion of a nut.

16. The multi-head bolt of claim 1, further comprising a tension-rod-shank fixed to an end of the bolt shaft opposing the multi-head, on which shank a nut can be screwed.

17. The multi-head bolt of claim 1, wherein the at least three pawls comprises four pawls.

18. The multi-head bolt of claim 1, wherein the bolt shaft defines a hole extending through the bolt shaft at an opposite end relative to the multi-head a for securing a safety split pin.

19. The multi-head bolt of claim 1, wherein each pawl has a flat portion arranged between the angled side and the support surface.

20. The multi-head bolt of claim 1, wherein the at least three pawls extend from the outer circumference of the shaft.

21. The multi-head bolt of claim 1, wherein the at least three pawls extend from the cylindrical portion of the shaft.

22. A multi-head bolt, comprising
a bolt shaft defining a longitudinal axis of the multi-head bolt, at least a portion of the bolt shaft being cylindrical and defining a diameter;
a multi-head disposed at a first end of the bolt shaft, the multi-head comprising at least three pawls, each pawl having a fixed radial orientation relative to the bolt shaft and having a primary plane being aligned with the longitudinal axis of the bolt shaft and having a support surface, wherein the at least three pawls are arranged around an outer circumference of the shaft,
wherein at least one pawl is shaped such that the primary plane lies on the longitudinal axis of the bolt shaft and the support surface is perpendicular to the primary plane, wherein a width of the at least one pawl is at least 15% of the diameter of the cylindrical portion of the bolt shaft and at maximum 65% of the diameter of the cylindrical portion of the bolt shaft.

23. The multi-head bolt of claim 22, wherein the at least one pawl is fin-shaped.

24. The multi-head bolt of claim 22, wherein a width defined between two lateral sides of the at least one pawl is constant along the longitudinal axis.

25. The multi-head bolt of claim 22, wherein the at least three pawls extend from the outer circumference of the shaft.

26. The multi-head bolt of claim 22, wherein the at least three pawls extend from the cylindrical portion of the shaft.

27. A multi-head bolt, comprising:
a bolt shaft defining a longitudinal axis of the multi-head bolt;
a multi-head disposed at a first end of the bolt shaft, the multi-head comprising at least three pawls, each pawl having a fixed radial orientation relative to the bolt shaft and having a primary plane being aligned with the longitudinal axis of the bolt shaft and having a support surface and having an angled side that intersects the primary plane and being inelastic and immovable relative to the bolt shaft, wherein a radial distance of the angled side relative to the bolt shaft decreases as measured from the support surface to the first end of the bolt, wherein each pawl has a flat portion arranged between the angled side and the support surface.

28. The multi-head bolt of claim 27, wherein the at least three pawls are arranged around an outer circumference of the shaft.

29. The multi-head bolt of claim 27, wherein the at least three pawls extend from the outer circumference of the shaft.

30. The multi-head bolt of claim 27, wherein the at least three pawls extend from the cylindrical portion of the shaft.

* * * * *